C. D. & O. J. BOEHMER.
Hand Corn-Planter.
No. 223,834.   Patented Jan. 27, 1880.
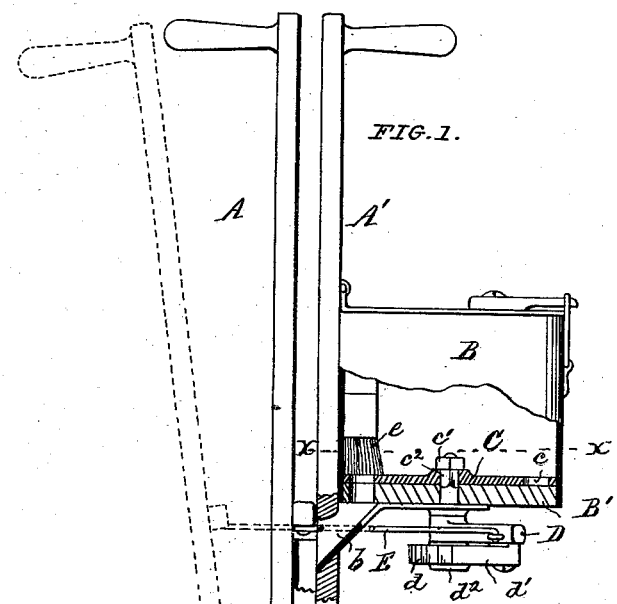
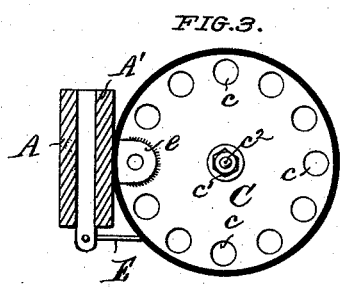
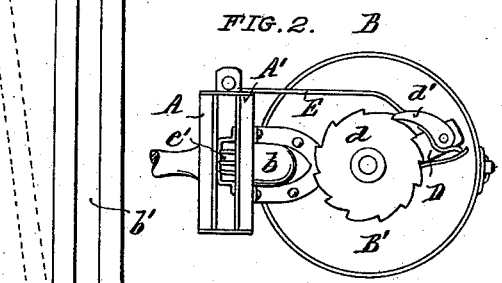
ATTEST:
John W. Herthel
Chas Herthel
INVENTORS
Chas D. and
Otto J. Boehmer
per Herthel & Co

UNITED STATES PATENT OFFICE.

CHARLES D. BOEHMER AND OTTO J. BOEHMER, OF WRIGHT CITY, MO.

HAND-CORN-PLANTER.

SPECIFICATION forming part of Letters Patent No. 223,834, dated January 27, 1880.

Application filed November 7, 1879.

*To all whom it may concern:*

Be it known that we, CHARLES D. BOEHMER and OTTO J. BOEHMER, of Wright City, Warren county, Missouri, have invented an Improved Hand Corn-Planter, of which the following is a specification.

Our invention relates more specially to the novel arrangement and operation of the parts that open and close the apertures in the bottom of the seed-hopper and regulate the passage through the implement of the seed to be planted.

We will first fully describe the construction and operation of our invention, also its advantages, and hereinafter point out in the claims the novel features thereof.

Of the drawings, Figure 1 is a sectional elevation. Fig. 2 is a bottom plan. Fig. 3 is a section plan on line $x\ x$ of Fig. 1.

A A' are the handles, the lower ends thereof having the cutters or drills $A^2$, as usual, wherewith to open the ground preparatory to dropping the seed.

The handles are joined some distance apart by side plates, $a$, one of the handles being pivoted at $a'$, as shown. The handles can therefore be closed together or pulled apart, as ordinarily, to open and close the lower end of the planter, and suit the action of inserting its said lower end in the ground, opening the hill, dropping the seed, and withdrawing the planter.

As stated, our invention relates more specially to the arrangement and operation of the parts constituting the cut-off, to control the passage of the required quantity of seed at a time through the implement, and said parts are as follows: To the side of the handle A' we secure the receptacle or seed-hopper B, in which the grain or seed to be planted is contained. The bottom B' of the hopper has an opening or aperture communicating to a branch tube, $b$, which further communicates with the discharge-tube $b'$, this latter being made to extend from the hopper to near the lower end of the implement, as shown.

C is the cut-off. It consists of a disk-plate having near its periphery a series of holes, $c$. The cut-off is arranged inside of the hopper, contiguous to its bottom, as shown. Further, by a nut, $c'$, the cut-off C is secured to a spindle, $c^2$, this latter passing through the bottom of the hopper and extending partly below same.

D is an arm journaled near the lower end of the spindle. Rigidly secured to the spindle, under the arm D, is the ratchet-wheel $d$, while a pawl, $d'$, is pivoted to said arm, and by a suitable spring said pawl is held in engagement with said ratchet-wheel, all as shown. $d^2$ is a nut to secure all the last-named parts to the spindle, so as to turn with same. The cut-off C turns simultaneously and only with the ratchet-wheel, and the latter is actuated by the vibratory motion the operator imparts to the handles, moving the rod E, which has one end secured to the handle A, the other end to the arm D. (See figures.)

$e$ is a brush secured inside the hopper in line with the apertures leading to the discharge-tube. This brush brushes away all the superfluous corn but those grains brought by the cut-off in line with the discharge-tube.

$e'$ represents points projecting from one side of the handle, near the outlet of the discharge-tube, to scatter the grains of corn and plant the same some distance apart in the same hill.

The parts that control the operation of the cut-off C can be arranged to suit the planting of three or more or less number of grains in each hill at a time, if desired. Thus a longer or shorter rod, E, or one having a series of holes for a tap on the handle A to engage, can be provided, so as to increase or diminish the distance of vibration of the handles, and the consequent greater or less turn of the ratchet-wheel and the cut-off.

We prefer the connection of the parts that operate the ratchet-wheel to be such that the operator can actuate the wheel the distance of three teeth at each movement, and operate the cut-off to bring three grains of corn to the discharge-tube at each vibration of the handles.

Our hand-planter thus constructed is operated and used in the manner following: The grain being contained in the hopper, the operator pulls the hand-levers apart, and in so doing the cut-off C is operated to force the required number of grains in line with and to drop down the discharge-tube, the cutters or drills having been closed by the same movement, thus retaining the seed in the lower part of the implement. In the act of planting the seed the lower end of the implement is thrust into the ground. The operator forces the hand-levers together, which restores the cutters or drills, opening at the same time the ground, and permits the corn previously lodged near the lower part of the implement to drop into the hill.

In closing the hand-levers the cut-off C remains stationary, the rod forcing the arm D and its pawl to original position. By the next vibration of the hand-levers the same operation of the parts is repeated.

The advantages of our improvement consist in its reliable operation; also, that it is durable and cheap.

What we claim is—

In a hand corn-planter, the levers A A', carrying the tube $b'$, communicating by branch tube $b$ to seed-hopper B, this having its outlet controlled by a brush, $e$, and the cut-off C, consisting of a disk having apertures $c$, said cut-off secured to the spindle $c^2$, the latter passing through the bottom of the hopper, the arm D, journaled to said spindle, the ratchet-wheel $d$, made rigid to said spindle, the pivoted pawl $d'$ and its spring, the nut $d^2$, and rod E, all said parts combinedly operating substantially as described, as and for the purpose set forth.

In testimony of said invention we have hereunto set our hands.

CHAS. D. BOEHMER.
OTTO J. BOEHMER.

Witnesses:
F. RITTER,
FRIED. NIEBURG.